(12) United States Patent
Paisley

(10) Patent No.: US 6,680,137 B2
(45) Date of Patent: Jan. 20, 2004

(54) INTEGRATED BIOMASS GASIFICATION AND FUEL CELL SYSTEM

(75) Inventor: Mark A. Paisley, Columbus, OH (US)

(73) Assignee: Future Energy Resources Corporation, Norcross, GA (US)

( * ) Notice: Subject to any disclaimer, the term of this patent is extended or adjusted under 35 U.S.C. 154(b) by 100 days.

(21) Appl. No.: 10/122,505

(22) Filed: Apr. 15, 2002

(65) Prior Publication Data

US 2002/0194782 A1 Dec. 26, 2002

Related U.S. Application Data

(63) Continuation-in-part of application No. 09/990,669, filed on Nov. 16, 2001, now Pat. No. 6,613,111.
(60) Provisional application No. 60/283,970, filed on Apr. 16, 2001, and provisional application No. 60/249,634, filed on Nov. 17, 2000.

(51) Int. Cl.[7] .......................... H01M 8/18; H01M 8/00; C01B 3/24; B01J 8/18
(52) U.S. Cl. ...................... 429/19; 429/17; 429/13; 422/139; 48/197 FM
(58) Field of Search ................... 429/19, 17, 13, 429/12, 2, 26; 422/139; 48/197 FM

(56) References Cited

U.S. PATENT DOCUMENTS

| | | | |
|---|---|---|---|
| 4,828,581 A | | 5/1989 | Feldmann et al. |
| 4,921,765 A | * | 5/1990 | Gmeindl et al. ............... 429/16 |
| 5,554,453 A | * | 9/1996 | Steinfeld et al. .............. 429/17 |
| 6,048,374 A | | 4/2000 | Green |
| 6,074,769 A | | 6/2000 | Johnssen |
| 6,133,328 A | | 10/2000 | Lightner |

* cited by examiner

Primary Examiner—Patrick Ryan
Assistant Examiner—R Alejandro
(74) Attorney, Agent, or Firm—Troutman Sanders LLP; Ryan A. Schneider

(57) ABSTRACT

An integrated biomass gasification and fuel cell system wherein the electrochemical reaction in the fuel cell is effected by providing the reactant gases from a gasifier. Fuel gas from the gasifier is directed to the anode of the fuel cell and at least a portion of the exhaust gas from the anode is directed to the combustor. The portion of the exhaust gas from the anode is then combusted to recover residual energy to increase the overall efficiency of integrated biomass gasification and fuel cell system. Also, the oxidant gas from the combustor may be directed to the cathode of the fuel cell.

20 Claims, 4 Drawing Sheets

INTEGRATED BIOMASS GASIFICATION AND FUEL CELL SYSTEM

CROSS-REFERENCE TO RELATED APPLICATION

This application incorporates by reference and claims priority from U.S. Provisional Patent Application Serial No. 60/283,970, filed Apr. 16, 2001. This application is also a continuation-in-part application of pending U.S. Non-Provisional Patent Application Serial No. 09/990,669, filed Nov. 16, 2001 now U.S. Pat. No. 6,613,111, which in turn claims priority of U.S. Provisional Patent Application Serial No. 60/249,634, filed Nov. 17, 2000, disclosures of which are incorporated herein by reference.

FIELD OF INVENTION

This invention relates to a system and method for generating energy from a variety of biomass feedstocks, and more particularly to a system for generating energy which a biomass gasifier system in conjunction with an integrated fuel cell.

BACKGROUND OF THE INVENTION

Fuel cells have long been used in the space program to provide electricity and drinking water to astronauts. In the future, the electric power industry is expected to be an area where fuel cells will be widely commercialized. The electric power industry has generally been looking toward the use of fuel cells in relatively large electrical power generating applications. Power generation by fuel cells offers the advantages of high efficiency and low environmental emissions. Thus, fuel cells may offer a more economical means of power production than other existing power producing technologies.

Fuel cells produce electrical power by converting energy from the reaction of various products directly into electrical energy. An input fuel is chemically reacted in the fuel cell to create an electrical current. An electrolyte material is sandwiched between two electrodes, an anode and a cathode, making up the fuel cell. The input fuel passes over the anode, where it splits into ions and electrons. The electrons go through an external circuit to serve an electric load while the ions move through the electrolyte toward the oppositely charged electrode. At the electrode, ions combine to create by-products, primarily water and carbon dioxide. Depending on the type of electrolyte used in the fuel cell, different chemical reactions will occur.

For example, in some systems, hydrogen rich fuels and an oxidant gas, such as air are fed into a fuel cell stack, a series of electrode plates interconnected to produce a set voltage of electrical power. Typically, the hydrogen rich fuel gas is fed to the anode of the cell, while the cathode receives oxidant gas or air. Internal reforming of any hydrocarbons present in the fuel gas occurs at the anode. The reformed fuel gas in the anode compartment and the oxidant gas in the cathode compartment, in the presence of the electrolyte of the cell, undergo electrochemical conversion to generate electrical power.

There are several different types of fuel cells, the parameters of which can vary depending on what the cell will be used for, the structure of the cell and the materials used. These include proton exchange membrane fuel cells (PEFC), phosphoric acid fuel cells (PAFC), solid oxide fuel cells (SOFC) and molten carbonate fuel cells, among others.

Molten carbonate fuel cells (MCFC) use a molten carbonate salt mixture as an electrolyte. The composition of the electrolyte varies, but may consist of lithium carbonate and potassium carbonate. At the operating temperature of about 1200° F., the salt mixture is liquid and a good ionic conductor. The electrolyte is suspended in a porous, insulating and chemically inert ceramic ($LiAlO_2$) matrix. The chemical reactions of the MCFC are as follows.

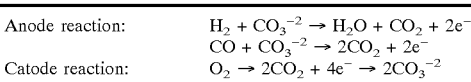

Solid oxide fuel cells (SOFC) use a ceramic, solid-phase electrolyte which reduces corrosion considerations and eliminates eletrolyte management problems sometimes associated with liquid electrolyte fuel cells. A preferred ceramic is yttria-stabilized zirconia, an excellent conductor of negatively charged oxide ions at high temperatures. The anode is preferably porous nickel/zirconia cement, while the cathode is preferably a magnesium-doped lanthanum manganate. The SOFC reactions are as follows.

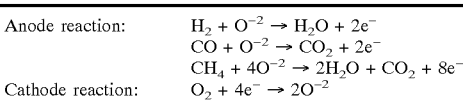

Phosphoric acid fuel cells (PAFC) uses liquid phosphoric acid as the electrolyte. The acid is contained in a TEFLON bonded silicone carbide matrix, the small pore structure of which keeps the acid in place through capillary action. Platinum catalyzed, porous carbon electrodes are used on both the anode and the cathode sides of the electrolyte. The PAFC reactions that occur are as follows.

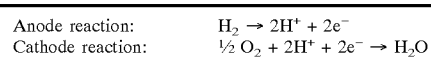

Proton exchange membrane fuel cells (PEFC) use a polymer membrane as the electrolyte. The membrane is an electronic insulator, but an excellant conductor of hydrogen ions. The PEFC membrane consists of fluorocarbon polymer materials, for example TEFLON, to which sulfonic acid groups are attached. The protons on these acid groups are free to migrate through the membrane. Platinum is used at both the anode and the cathode.

The electrode reactions in the PEFC are analogous to those in the PAFC, and are as follows.

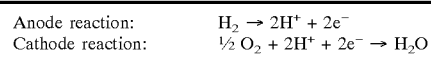

Molten carbonate fuel cells and solid oxide fuel cells are well suited for using heated gas streams and, thus, have shown the most promise in industrial power generation applications. There are several known sources for fuel gas suitable for use in these fuel cells. Natural gas may be used as a fuel, although it may be necessary to use a fuel processor to boost the concentration of hydrogen present in the natural gas. Fuel gas may also generated in coal gasifiers, which generate hydrogen, carbon monoxide and carbon dioxide has also been found suitable for use as a fuel gas to feed fuel cells. Additionally, biomass gasifiers are also known in the art and have been found useful for the production of fuel gases in remote areas or in areas wherein a large amount of agricultural biomass waste is produced.

Greater efficiency in conventional fuel cells may be obtained through integration with coal or biomass gasifiers. For example, U.S. Pat. No. 4,921,765 to Gmeindl et al. discloses a combined gasifier and fuel cell system wherein the gas stream travels from the gasifier through an external carbon dioxide separator. In the Gmeindl et al. fuel cell system, the anode reaction gases are recycled to provide the steam and heat needed to support the gasifier. The process disclosed in the Gmeindl process uses coal or coal char to feed the system.

U.S. Pat. No. 5,554,453 to Steinfeld et al. discloses a carbonate fuel cell system with thermally integrated gasification. The system disclosed by Steinfeld uses a portion of the output gas from a gasifier as the fuel gas for a molten carbonate fuel cell (MCFC). The remainder of the output gas is combusted to provide heat for driving the gasification reaction and to produce a $CO_2$ rich exhaust gas. The $CO_2$ rich exhaust gas is mixed with air and used as the oxidant gas at the cathode of the fuel cell. Steinfeld discloses system configurations, one wherein a catalytic combustor is situated within the gasifier and the other with a catalytic combustor situated externally to the gasifier. Each of Steinfeld's fuel cell systems require either hot or cold gas clean-up, followed by expansion to provide moisturization of the gas. The Steinfeld et al. fuel cell system may be suitable for use with either a coal gasifier or with some biomass gasifiers.

Biomass gasification systems known in the art generally rely on combustion of a portion of the biomass feedstock to provide the heat required for gasification of the remainder of the biomass feedstock. However, the combustion of a portion of the raw biomass stream for heat production can significantly reduce the overall efficiency of the gasifier system. As a result, these systems generally operate at an efficiency of less than 25% overall conversion efficiency to electrical power.

Higher efficiencies, approaching 60% have been achieved using the combustion of natural gas to provide heat for the gasification process, however, natural gas is not always readily available. It has also proven advantageous to utilize the waste carbonaceous char produced in the gasification as a fuel source for generating heat in a combustor. Since the char is basically a waste product from the gasifier, its consumption in the combustor has less of an adverse effect on the system efficiency than is seen in systems wherein a portion of the raw biomass is used as a combustor fuel source.

U.S. Pat. No. 4,828,581 to Feldmann et al., describes an exemplary gasifier system for the production of fuel grade gas from carbonaceous fuels using very high biomass throughputs in a fluidized bed gasifier operating at low inlet gas velocities. The process described in Feldmann et al. uses a combustor to heat a bed of fluidized sand, which is directed to a gasifier wherein the heated sand serves as a heat source for the pyrolysis of the biomass material. Unlike prior systems, the system of Feldmann et al. relies on the entrainment of char in a flow of sand from the gasifier outlet to the combustor to allow operation at an advantageously low inlet velocity. The Feldman et al. system is suited to the production of a medium BTU gas which may be used as a fuel source in a fuel cell system.

The biomass gasification system described in Feldman also has the advantage of being adaptable to relatively small scale applications. Generally, due to heat loss considerations, the efficiency of biomass gasifiers increases with increasing input of feedstock material. At decreasing inputs, prior art systems reach a point at which the percentage of heat loss increases exponentially, effectively limiting these prior systems to inputs of greater than approximately 100 tons per day. If throughput is defined as the ratio of input to cross section, then at high throughputs the ratio becomes less favorable and requires a higher overall system input to maintain an acceptable level of efficiency. Accordingly, prior to the development of the Feldman system, many systems were limited to operation at feedstock input rates of greater than approximately 100 tons per day.

However, there are many applications wherein in it is impractical to maintain high feedstock input rate on the order of 100 tons per day, such as to provide power to small communities or industrial facilities having low power requirements. It would clearly be desirable to operate these systems at a higher throughput because the resulting gasifier unit could be both smaller and cheaper to construct than a conventional low-throughput gasifier of the same capacity. Prior conventional gasifier systems have required a tradeoff between unit cost and efficiency.

Accordingly, it is an object of the present invention to provide an integrated biomass gasification and fuel cell system having a gasifier capable of operating at a wide range of feed rates such as from 20 to 1000 tons per day, or greater.

Another object of the present invention is to provide an integrated biomass gasification and fuel cell system which operates at a high temperatures, thus increasing the quantity of product gas produced per unit of biomass fed and increasing overall efficiency of energy production.

It is yet another object of the present invention to provide an improved integrated biomass gasification and fuel cell system wherein anode offgas is recycled and used to produce heat to provide increased efficiency of energy production.

SUMMARY OF THE INVENTION

The present invention relates to a system and method for efficient energy generation from a variety of biomass feedstocks forms by integrating a fuel cell into a highly efficient parallel entrained bed pyrolysis gasification system. Gas is produced using a high throughput combination gasifier and combustor, wherein the exothermic combustion reactions can take place in or near the combustor while the endothermic gasification reactions take place in the gasifier. Heat from the exothermic reaction zone of the combustor is transferred to the endothermic reaction zone of the gasifier by circulation of an inert particulate solid such as sand. This separation of endothermic and exothermic processes results in a high energy density product gas without the nitrogen dilution present in conventional air-blown gasification systems.

The fuel cell utilizes the product gas generated by the gasifier as its anode gas. At least a portion of the exhaust gas from the anode is then routed to the combustor wherein it is combusted to recover a portion of its residual energy in the form of heat. By using the combustion of the anode exhaust gas to heat the gasifier, overall system efficiency can be increased. Oxidant gas from the combustor may also be directed to the cathode of the fuel cell.

DETAILED DESCRIPTION OF THE DRAWINGS

DETAILED DESCRIPTION OF THE INVENTION

Figure 1:
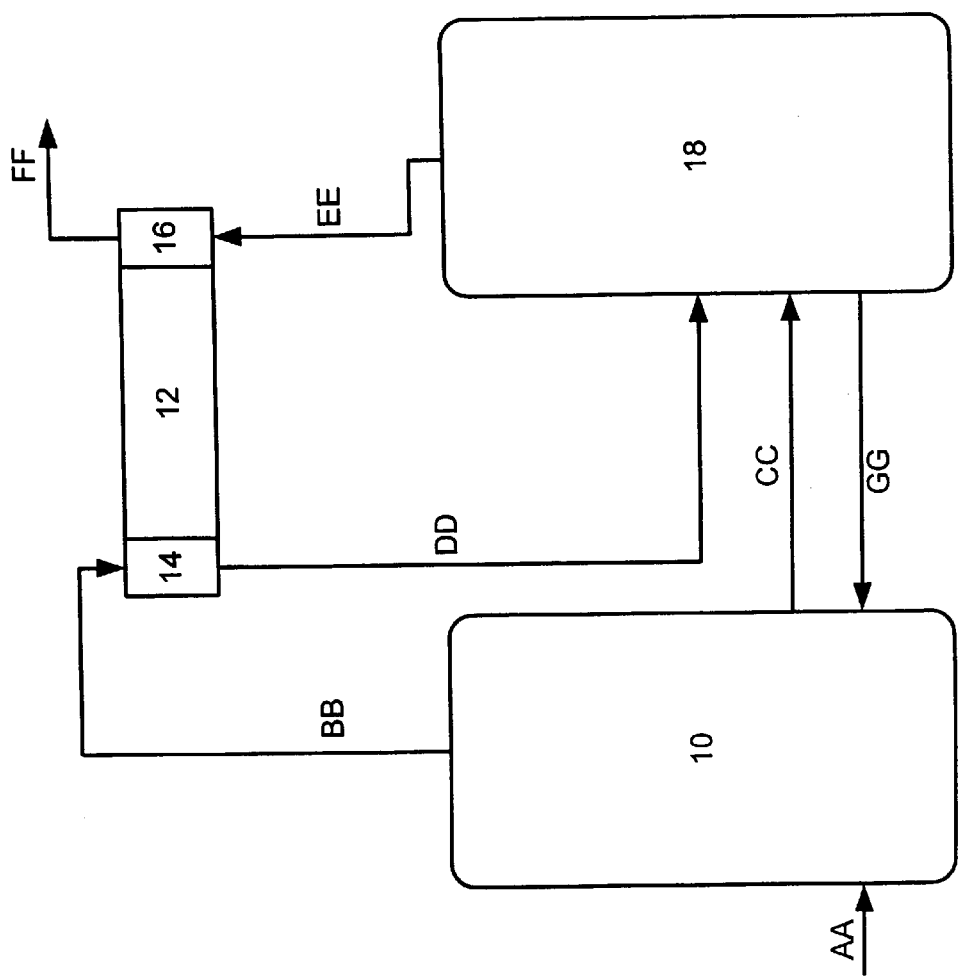
FIG. 1 is a block diagram illustrating an integrated fuel cell/gasifier system useful in the process according to a preferred embodiment of the present invention.

FIG. 1 illustrates an integrated biomass gasification and fuel cell system A in accordance with an exemplary embodiment of the present invention. As shown, system A includes a gasifier 10, a fuel cell 12 for producing electrical power and having an anode 14 and a cathode 16, and a combustor 18. Gasifier 10 receives a quantity of biomass feedstock AA and converts at least a portion thereof into to a fuel gas BB useful as a reactant gas for the fuel cell 12, and a carbonaceous char CC. At least a portion of fuel gas BB is used to drive chemical reactions at anode 14 of fuel cell and to produce an anode off gas DD. Combustor 18 combusts portions of carbonaceous char CC and anode off gas DD to produce an oxidant gas EE and heat. The heat is used to drive the reactions in gasifier 10, and the oxidant gas EE may be used to drive chemical reactions at cathode 16 of fuel cell 12 and to produce a flue gas FF.

The basic method of operating the parallel entrained bed pyrolysis portion of the present invention is similar to that disclosed in U.S. Pat. No. 4,828,581 to Feldmann et al., incorporated by reference, as if fully set forth herein. Briefly, in the exemplary embodiment, the process uses circulating fluidized bed reactors operating in tandem, one of which serves as gasifier 10 and the other as combustor 18. Fluidized sand is utilized as a heat transfer medium to transfer heat from combustor 18 to gasifier 10 to provide indirect heating to the biomass feedstock AA within the gasifier 10, driving its gasification. Sand and char particles from gasifier 10 are returned to combustor 18, wherein the char and combustible gases are exothermically combusted to reheat the fluidized sand. This process allows extremely high throughputs (>14,000 kg/hr-m2) and operates at a significantly higher temperature than typical biomass gasifiers. As a result, this system is well suited for operation at smaller scales than conventional gasifiers which become exponentially less efficient as feedstock consumption rates drop below approximately 100 tons/day.

Figure 2:
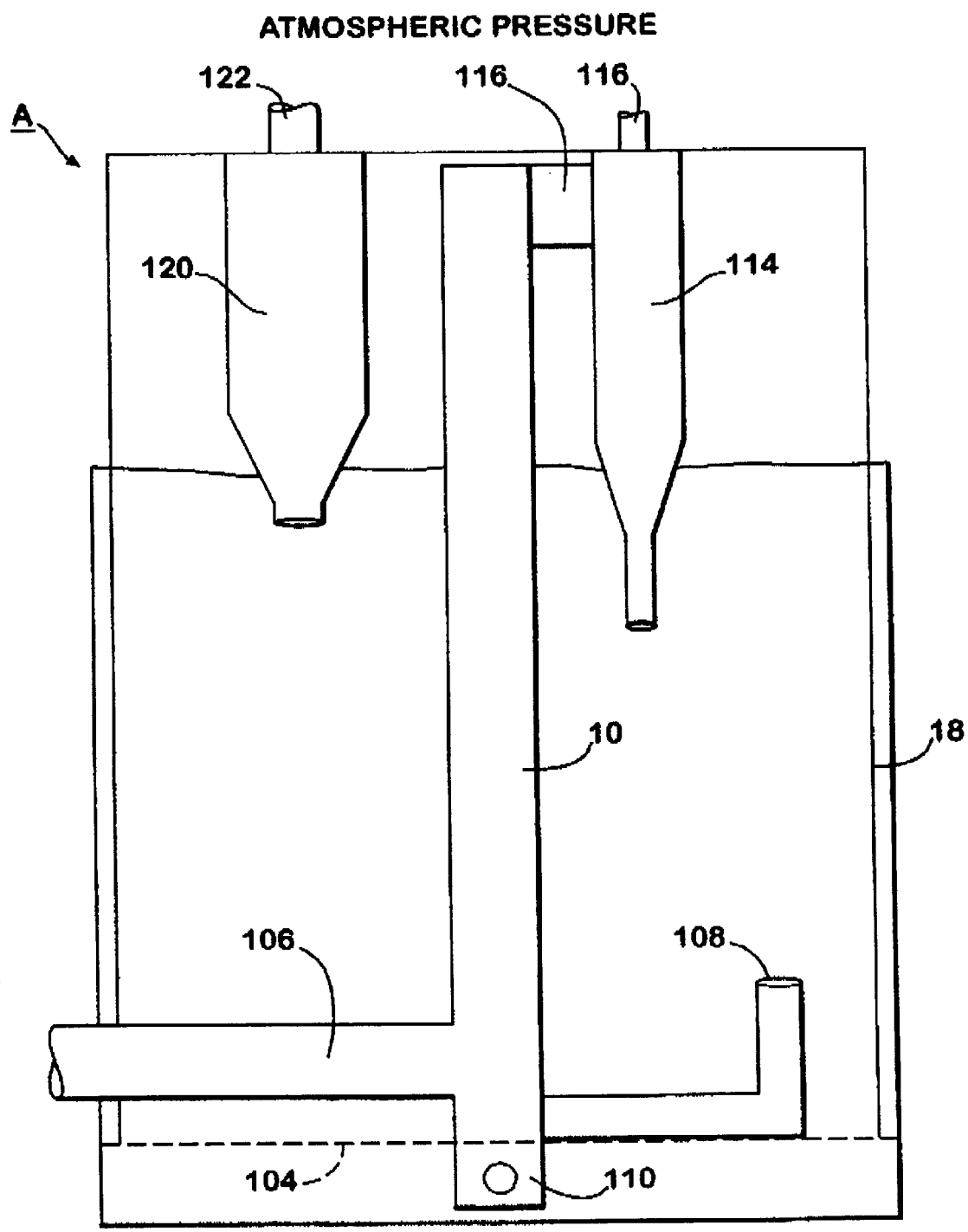
FIG. 2 illustrates a side view of a gasifier system useful in the process according to one embodiment of the present invention.
Figure 3:
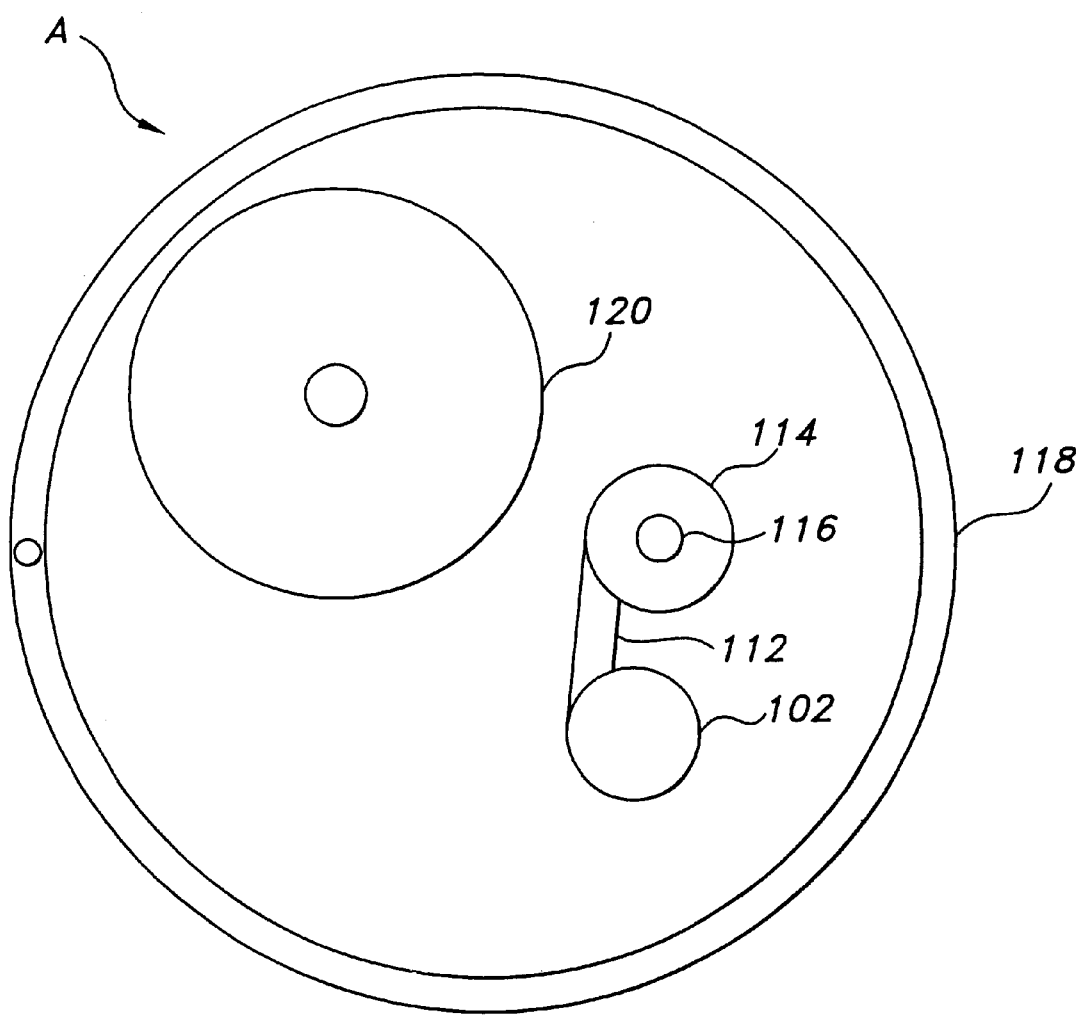
FIG. 3 illustrates an overhead view of the gasifier system of FIG. 2.

Gasifier 10 of the present invention generally includes a reactor with a fluid-bed of sand at the reactor base operated at biomass feed rates sufficiently high to generate enough product gas to circulate sand and gasified char by entrainment. An exemplary embodiment of the gasifier 10, as described in the '581 patent, is illustrated in FIG. 2 and FIG. 3. An annular gasifier 10 has a conventional gas distribution plate 104 near the bottom and has a biomass feedstock entry opening 106, an inert material circulation or recirculation opening 108, and a fluidizing gas inlet 110. Gasifier 10 has an exit 112 at or near the top leading to a separator 114 from which product gas is discharged through a product exit 116 and solids are recycled to the bottom of gasifier 10 or, preferably, recycled to exothermic combustor 18 and burned to reheat the inert material. In an exemplary embodiment, combustor 18 is concentrically disposed around gasifier 10 to further increase efficiency by reducing heat losses from the surface of gasifier 10. In the exemplary embodiment, exothermic combustor 18 includes a separator 120 having an exit 122 for discharging flue gas.

Gasifier 10 and combustor 18 operate with a recirculating particulate phase and at inlet gas velocities in the range required to fluidize the sand or other recirculating particulate phase. For example, a velocity of 0.8 to 2 ft/sec with a 20×50 mesh sand has allowed smooth stable operation. Velocities of 0.5 to 7 ft/sec can be used.

The gasifier 10 can operate at biomass feed rates that exceed 3000 lbs/hr of dry biomass per square foot of reactor cross sectional area. Throughputs of 4400 lbs-ft$^2$/hr are achievable and possibly even higher. The inlet for wood feed and recirculating sand is located at the base of the reactor in the neighborhood of the gas distributor. The gasifier 10 has provision for removal of the circulating particulate phase and char by entrainment. Separation of the entrained particulate phase, such as sand and char from the product gas, can be accomplished by conventional cyclone(s). System solids are elutriated by this process despite the low inlet gas velocities used.

The low inlet gas velocity high throughput biomass gasifier system A of the present invention can operate with biomass throughputs of greater than 100 and preferably 500–4400 lb/ft$^2$-hr but with inlet gas velocities of 0.5–7 ft/sec. These low gas inlet velocities also serve to reduce the erosion caused by circulation of the mixed bed material, which can be a problem in systems having a high gas inlet velocity.

Preferred materials for gasification include converted biomass, natural gas, alcohols, coal, petroleum products or any other hydrocarbon-containing material. Particularly preferred materials are converted biomass, especially shredded bark, wood chips, sawdust, sludges, peat or agricultural wastes and residues. All cellulosic type feed materials which include agricultural residues, dewatered sewage sludge, municipal solid waste (which is predominantly paper) and fuels derived from municipal solid wastes by shredding and various classification techniques may be used in the process of the present invention. Also, peat is an acceptable feedstock because of its high reactivity, as are lignitic coals.

The integrated biomass gasification and fuel cell system of the present invention contemplates the use of a variety of fuel cells. Preferred fuel cells include molten carbonate fuel cells, phosphoric acid fuel cells, solid oxide fuel cells and proton exchange membrane fuel cells. Particularly preferred fuel cells are molten carbonate fuel cells and solid oxide fuel cells.

As shown in FIG. 1, the exemplary embodiment of the present invention includes a high temperature carbonate fuel cell 12 which includes an anode 14 and a cathode 16. As previously noted, the fuel gas BB supplied to anode 14 is derived from the output of a gasifier 10, which is configured and operated in accordance with the principles of the present invention. The fuel cell 12 utilizes at least a portion of fuel gas BB to drive chemical reactions at the anode 14. Fuel gas BB generally comprises at least hydrogen, but may also include carbon monoxide and other reactant gases. At least a portion of the exhaust gas DD from the anode 14 is then routed to the combustor 18 wherein it is combusted to recover a portion of its residual energy in the form of heat. Combustor 18 combusts portions of carbonaceous char CC and anode off gas DD to produce an oxidant gas EE and heat. By using the combustion of the anode exhaust gas DD to heat the gasifier 10, overall system efficiency can be increased.

In one embodiment, a portion of the exhaust gas DD from the anode 14, but preferably not all the exhaust gas DD, is directed to the gasifier 10, and the remainder of exhaust gas DD from the anode 14 is directed to the combustor 18. Also, in another embodiment, oxidant gas EE, and other combustion products or gases, which include $CO_2$, from the combustor 18 may be directed to the cathode 16 of the fuel cell 12. Optionally, a portion of the cathode exhaust gas FF may be recirculated to the cathode 16 inlet to form a cathode gas recycle loop and further increase system efficiency.

Within the fuel cell 12, the fuel gas introduced into anode 14 is used as a reactant gas and internally reformed. The internally reformed fuel gas and the oxidant and other gases introduced into cathode 16, in the presence of the carbonate electrolyte of the fuel cell 12, then undergo an electrochemical reaction to produce a DC voltage output. The exhaust gas from the anode 14 is then carried from the anode 14 exit to combustor 18, as above-described.

Figure 4:
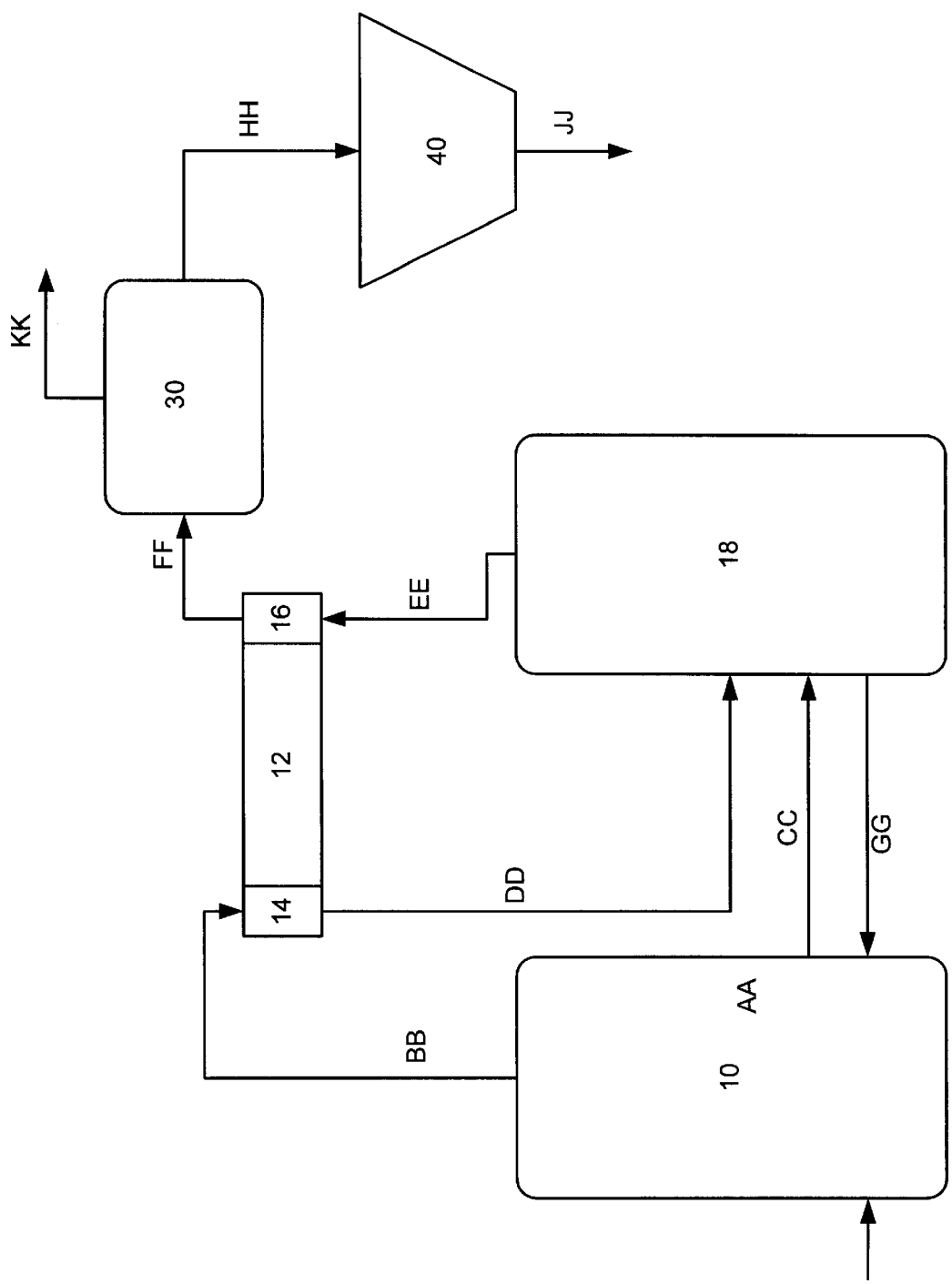
FIG. 4 illustrates an alternative embodiment of the gasifier system of FIG. 1 utilizing a heat recovery steam generator and a steam turbine.

In an alternative embodiment of the present invention, as shown in FIG. 4, the exemplary system depicted in FIG. 1 may also include a heat recovery steam generator 30 and a steam turbine 40. The cathode exhaust gas FF may be passed to the heat recovery steam generator 30 to produce steam. Excess steam HH from the steam generator 30 may be passed to the steam turbine 40 to produce water JJ, as well as additional power to further increase system efficiencies. Also, a portion KK of this steam may be exhausted from the steam generator 30 or instead be heated in a heating unit and then introduced into the gasifier 10 for use in the gasification reaction.

One embodiment of operating a gasifier according to this invention includes introducing inlet gas at a gas velocity generally less than 7 ft/sec to fluidize a high average density bed in a gasifier 100. The high average density bed is formed into a dense fluidized bed in a first space region by means of the inlet gas. The dense fluidized bed contains a circulating first heated relatively fine and inert solid bed particle component. Carbonaceous material, such as for example biomass, is introduced into the first space region with dense fluidized bed at a rate from 100–4400 lbs/ft$^2$-hr and more preferably 500–4400 lbs/ft$^2$-hr and endothermal pyrolysis of the carbonaceous material is accomplished by means of the circulating heated inert material so as to form a product gas. Contiguous to and above the dense fluidized bed a lower average density entrained space region is formed containing an entrained mixture of inert solid particles, char and carbonaceous material and the product gas.

The entrained mixture is then removed from the entrained space region of the gasifier 10 to a separator 114 such as a cyclone wherein the entrained mixture of inert solid particles, char and carbonaceous material is separated from the product gas. Residence time of the carbonaceous material in the gasifier 10 typically does not exceed 3 minutes on average. Finally, at least the inert solid particles are returned to the first space region after passage through an exothermic reaction zone such as a combustor 18 to first heat the inert particles. To facilitate the exothermic reaction, it can be advantageous to route the entire entrained mixture absent product gas through the combustor 18. To further increase the efficiency of the system it is advantageous to position the exothermic reaction zone of the combustor 18 to concentrically surround the gasifier 10, thereby reducing heat loss from the exterior surfaces of the gasifier 10.

In this invention a fluidized bed of heated sand or other relatively inert material at the lower end of the gasifier 10 forms a region of relatively high density. Inputted wood or other carbonaceous material, being lighter than the sand, floats on the fluidized sand. As the wood is gasified by the hot sand, an entrained region of sand, char and carbonaceous particles forms in the upper end of the gasifier 10.

The highest concentration of entrained wood is found at the top of the densely fluidized zone within the gasifier 10. Entrained hot sand circulates through the entrained wood and char. As the carbonaceous particles pyrolyze, they generate gas forming a high velocity region above the fluidized bed. Despite a low gas inlet velocity below the bed the gas velocity above the fluidized bed becomes high enough to actually remove particles from the bed.

By operating at low inlet gas velocity, high residence time (up to 3 minutes on average) in the reaction vessel can be achieved while still allowing high throughputs of carbonaceous material generating gas to form the entrained region above the fluidized region.

In this system, solids are removed from the top of the vessel, and removed from the system by entrainment despite the low inlet gas velocities below the bed. This is made possible by the design of using a fluidized region, above which is an entrained region from which all bed particles including inerts and char are removed. Entrainment occurs in part because of the gas generated in situ contributing significantly to the volume of gas moving through the reaction vessel, while avoiding destructive slugging.

The carbonaceous material fed to the gasifier 10 can have greater than 60% of the available carbon converted upon a single pass through the gasifier system A. The remainder of the carbon is burned in the combustor 18 to generate heat for the pyrolysis reaction. If other fuel is used in the combustor 18, then additional carbon can be converted in the gasifier 10. With wet fuels, such as municipal waste, carbon conversions might vary upward or downward depending on the operating temperature of the gasifier 10.

The inlet gas fed to the gasifier 10 typically can be steam, recycled-product-gas, combustion by-product gas, inert gases such as nitrogen, and mixtures thereof. Preferred gases for the invention are steam and recycled-product-gas. Addition of other gases such as inert gases or combustion by-product gases will reduce the efficiency and advantages of the invention. Likewise, the addition of air or oxygen reduces the efficiency and advantages of the invention and should not be used.

Steam is a convenient gas because it is relatively cheap and can be condensed from the product gas prior to distribution. Nitrogen, on the other hand, while allowing the same carbon conversion and the same product gas distribution remains in the product gas as diluent thereby reducing its utilization value.

Air or oxygen are not used because the heat required to gasify the feed is introduced by the hot circulating inert solids whereas in some prior art systems the oxygen burns a portion of the char and product gases to provide heat. This reduces the utilization value of the product gas.

The present invention uses entrainment of char to beneficial advantage to obtain high carbonaceous feedstock throughput. Additionally, the efficiency of the system is increased by positioning the gasifier 10 within the exothermic reaction zone of combustor 18, thereby reducing heat loss from the gasifier 10 to the ambient environment. Commercial advantage of this invention becomes immediately apparent as more throughput means higher production levels through the same or smaller sized equipment, thus a significant reduction in capital costs results from this technology.

In this invention entrained material exits the vessel near the top of the gasifier 10 to a cyclone or other inertial settling device 114 for separating the product gas from the char, carbonaceous material and inert material. All system solids are entrained except for unwanted tramp material such as scrap metal inadvertently introduced with the fuel feedstock, for which a separate cleanout provision may be needed.

The system of the present invention is versatile and could be combined with any type of combustor, fluidized, entrained, or non-fluidized, for heating the inert material. The inert material is heated by passage through an exothermic reaction zone of a combustor to add heat. The inert material is understood to mean relatively inert as compared to the carbonaceous material and could include sand, limestone, and other calcites or oxides such as iron oxide. Some of these "relatively inert materials" actually could participate as reactants or catalytic agents, thus "relatively inert" is used as a comparison to the carbonaceous materials and is not used herein in a strict or pure qualitative chemical sense as commonly applied to the noble gases. For example, in coal gasification, limestone is useful as a means for capturing sulfur to reduce sulfate emissions. Limestone might also be useful in catalytic cracking of tar in the gasifier 10.

The height of the gasifier 10 should generally be sufficient to permit complete pyrolysis of the upward flowing carbonaceous material at the contemplated throughput rates. The emerging char ejected from the gasifier 10 should have sufficient heat to satisfy heat requirements for gasification. In the present invention a height of 22 feet has been found to be sufficient. A desirable of height for a particular gasifier 10 can be easily determined once knowing the teachings of the invention.

It will be evident to those skilled in the art that start-up of the gasifier 10 for example coupled to a combustor 18 would involve the stages of heat-up and initiation of gasification. These stages could be comprised as follows:

A. Gasifier Start-Up

Natural gas or some other carbonaceous fuel, which could be wood, is ignited in the combustor 18 and burned at a rate sufficient to increase the combustor 18 temperature at a rate which will not induce spalling of the ceramic lining. Circulation of sand is then initiated between the gasifier 10 and combustor 18 to heat-up the gasifier 102. The gasifier 10 will also be heated by direct heat transfer through the exterior surfaces of the gasifier 10 from the concentrically surrounding combustor 18. During the heat-up stage, air can be used as the transport gas in both gasifier 10 and combustor 18. Gas velocities and wood throughputs in both the gasifier 10 and combustor 18 must be sufficient to entrain the sand to allow for its circulation between gasifier 10 and combustor 18. This would require a gas velocity on the order of 15 ft/sec with the sand particle size range that we employ. The combustion of an auxiliary fuel and circulation of the hot sand is continued until the gasifier 10 reaches the desired temperature (about 1400 to 1500 F.).

B. Initiation of Gasification

After the gasifier 10 reaches the desired 1400 to 1500 F., at this time the feed gas to the gasifier 10 is switched from air to steam and then, if desired, to recycle product gas. Wood feed is initiated and the wood feed rate gradually increased. As the wood gasifies, char is produced which is transported to the combustor 18 where it is burned to replace the start-up fuel. As the wood feed rate is increased, the feed gas (steam or recycle product gas) to the gasifier 10 is gradually reduced until the system is operating in the range of gas velocities generally not exceeding 7 ft/sec.

While wood and wood derivatives have been specifically discussed herein, other carbonaceous materials will also work in the invention. All cellulosic type feed materials which include agricultural residues, dewatered sewage sludge, municipal solid waste (which is predominantly paper) and fuels derived from municipal solid wastes by shredding and various classification techniques. Also, peat is an acceptable feedstock because of its high reactivity as are lignitic coals. The tests have establish that it is possible to convert over 90 percent of the carbon in cellulosic type feed materials. However at these high carbon conversion levels, unless additional energy is available from some other source, there is not sufficient energy in the unconverted carbon to provide the heat for "gasification". Therefore, coal or other volatile containing carbonaceous materials can be used to supplement the cellulosic type feeds because the volatile portion of the coal will be converted to gas and the remaining char will provide sufficient heat to gasify nearly all of the cellulosic feed as well as the volatiles in the coal.

Introduction of all these materials can be accomplished by any conventional means such as screw feeders, solid metering valves, or pneumatic conveying.

It thus will be appreciated that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A system for producing energy from a biomass feedstock, said system comprising:
   a fluidized bed gasifier for heating a biomass feedstock to produce a fuel gas comprising at least hydrogen and carbon monoxide, said fluidized bed gasifier also producing carbonaceous char;
   a combustor, for receiving said carbonaceous char from said fluidized bed gasifier and burning said carbonaceous char to produce heat and oxidant gas comprising at least carbon dioxide and oxygen; and
   a fuel cell for producing electric power, said fuel cell having an anode and a cathode, said fuel gas from said gasifier directed to said anode of said fuel cell, and at least a portion of exhaust gas from said anode directed to said combustor, wherein said portion of said exhaust gas from said anode is combusted to recover residual energy to increase the efficiency of said system.

2. The system of claim 1 wherein said oxidant gas from said combustor is directed to the cathode of said fuel cell.

3. The system of claim 1 wherein a portion of said exhaust gas from said anode is directed to said gasifier.

4. The system of claim 1 wherein said oxidant gas from said combustor is directed to the cathode of said fuel cell, a portion of said exhaust gas from said anode is directed to said gasifier, and the remainder of said exhaust gas from said anode is directed to said combustor.

5. The system of claim 1 wherein said combustor is concentrically disposed around said gasifier, thereby increasing efficiency by reducing heat losses from said gasifier.

6. The system of claim 1 wherein said system is adapted to have a gas velocity generally in the range of approximately 0.5 to 7.0 ft/sec.

7. The system of claim 1 wherein said system is adapted to permit biomass throughputs of about 100 lbs/ft$^2$-hr to 4400 lbs/ft$^2$-hr.

8. The system of claim 1 wherein said system is adapted to permit biomass throughputs of about 500 lbs/ft$^2$-hr to 4400 lbs/ft$^2$-hr.

9. The system of claim 1 wherein said system is adapted to have a gas velocity generally not exceeding 7 ft/sec. and wherein said system is adapted to permit biomass throughputs of about 100 lbs/ft$^2$-hr to 4400 lbs/ft$^2$-hr.

10. The system of claim 1 wherein said carbonaceous char from said gasifier is returned to said combustor when said char and combustible gases are exothermically combusted to reheat a heat transfer medium in said combustor.

11. A method of operating an integrated gasification and fuel cell system, said method comprising the steps of:
   introducing inlet gas to fluidize a high average density bed in a first space region;
   introducing carbonaceous material into said first space region with said dense fluidized bed;
   circulating inert material to form a product gas;
   forming a lower average density entrained space region contiguous to and above said dense fluidized bed, said lower average density entrained space region containing an entrained mixture of inert solid particles, char, carbonaceous material and said product gas;
   providing said gas product generated by said gasifier to a fuel cell to use as an anode gas; and
   at least a portion of exhaust gas from said anode directed to said combustor, wherein said portion of said exhaust gas from said anode is combusted to recover residual energy to increase the efficiency of said system.

12. The method of claim 11 further comprising the step of providing carbon dioxide and oxygen from exhaust of said combustor to a fuel cell to use as an oxidant gas.

13. The method of claim 1 comprising the steps of directing a portion of said exhaust gas from said anode to said gasifier, and directing the remainder of said exhaust gas from said anode to said combustor.

14. The method of claim 11 further comprising the following steps:
   removing said entrained mixture from said entrained space region to a separator;
   separating said entrained mixture of said inert solid particles, said char, and said carbonaceous material from said product gas; and
   returning said inert solid particles to said first space region after passage through an exothermic reaction zone.

15. The method of claim 14 wherein said entrained mixture absent said product gas is routed through a combustor to facilitate said exothermic reaction.

16. The method of claim 11 wherein said inlet gas is introduced at a gas velocity of generally less than 7 ft/sec.

17. The method of claim 16 wherein a residence time of up to about 3 minutes on average in said gasifier is achieved as a result of said gas velocity of generally less than 7 ft/sec and said carbonaceous material being introduced at a rate from about 100 lbs/ft$^2$-hr to about 4400 lbs/ft$^2$-hr.

18. The method of claim 11 wherein said inlet gas has a gas velocity to said gasifier generally not exceeding 7 ft/sec. as the rate of said carbonaceous material to said gasifier is increased.

19. The method of claim 11 wherein said step of introducing said carbonaceous material includes introducing said carbonaceous material at a rate from about 100 lbs/ft2-hr to about 4400 lbs/ft$^2$-hr.

20. The method of claim 11 wherein said carbonaceous material is preferably introduced at a rate of about 500 lbs/ft$^2$-hr to about 4400 lbs/ft$^2$-hr.

* * * * *